United States Patent
Simmons et al.

(10) Patent No.: US 10,518,517 B2
(45) Date of Patent: Dec. 31, 2019

(54) METHODS AND APPARATUS FOR LAMINATION OF RIGID SUBSTRATES BY SEQUENTIAL APPLICATION OF VACUUM AND MECHANICAL FORCE

(71) Applicant: PerkinElmer Health Sciences, Inc., Waltham, MA (US)

(72) Inventors: Reed Simmons, Snohomish, WA (US); Tatsuya Minakawa, Yokohama (JP); Michael Corliss, Wilsonville, OR (US); Alan Swan, Wilsonville, OR (US); Nick Zenner, White Bear Lake, MN (US); Emily Fanucci, White Bear Lake, MN (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 334 days.

(21) Appl. No.: 15/300,213

(22) PCT Filed: Mar. 27, 2015

(86) PCT No.: PCT/US2015/023033
§ 371 (c)(1),
(2) Date: Sep. 28, 2016

(87) PCT Pub. No.: WO2015/148945
PCT Pub. Date: Oct. 1, 2015

(65) Prior Publication Data
US 2017/0182758 A1      Jun. 29, 2017

Related U.S. Application Data

(60) Provisional application No. 61/971,726, filed on Mar. 28, 2014.

(51) Int. Cl.
B32B 37/10      (2006.01)
B32B 7/12       (2006.01)
(Continued)

(52) U.S. Cl.
CPC .......... *B32B 37/1018* (2013.01); *B30B 12/00* (2013.01); *B32B 7/12* (2013.01);
(Continued)

(58) Field of Classification Search
CPC ..... B32B 37/1018; B32B 37/12; B32B 37/10; B32B 37/0046; B32B 37/003;
(Continued)

(56) References Cited

U.S. PATENT DOCUMENTS 4,681,649 A    7/1987  Fazlin
5,088,400 A *  2/1992  Ferguson ............ B30B 15/0029
                                                 100/214

(Continued)

FOREIGN PATENT DOCUMENTS

JP    2004-330291 A    11/2004

OTHER PUBLICATIONS

IBM Technical Disclosure, Koch, P., Pohl, G., and Schmid, H.J., "Method for Operating a Multiple-Layer Laminating Press," published Jan. 1, 1986 (IP.com No. IPCOM000059721D; electronic publication date: Mar. 8, 2005).*

(Continued)

*Primary Examiner* — Christopher T Schatz
*Assistant Examiner* — Cynthia L Schaller
(74) *Attorney, Agent, or Firm* — Seed Intellectual Property Law Group LLP

(57) ABSTRACT

Method and apparatus for lamination of substrates, e.g. rigid plastic layers, to manufacture laminated products. The methods include the sequential application of vacuum and mechanical force through a two-stroke process performed by a lamination apparatus having one or more force-producing stroke cylinders. Actuation of a cylinder to produce a first stroke creates a sealed chamber within the apparatus, enclosing a stack of substrates to be laminated. The sealed chamber (Continued)

may be evacuated of air by application of a vacuum. Subsequent actuation of a cylinder to produce a second stroke applies mechanical force to the sealed chamber, which compresses the substrates into a laminated product substantially free of air bubbles or voids.

11 Claims, 9 Drawing Sheets

(51) Int. Cl.
*B32B 27/08* (2006.01)
*B32B 27/28* (2006.01)
*B32B 27/30* (2006.01)
*B32B 27/32* (2006.01)
*B32B 27/36* (2006.01)
*B32B 27/40* (2006.01)
*B32B 37/12* (2006.01)
*B32B 37/00* (2006.01)
*B30B 12/00* (2006.01)
*B32B 38/18* (2006.01)

(52) U.S. Cl.
CPC ............ *B32B 27/08* (2013.01); *B32B 27/283* (2013.01); *B32B 27/286* (2013.01); *B32B 27/30* (2013.01); *B32B 27/32* (2013.01); *B32B 27/322* (2013.01); *B32B 27/325* (2013.01); *B32B 27/36* (2013.01); *B32B 27/40* (2013.01); *B32B 37/003* (2013.01); *B32B 37/0046* (2013.01); *B32B 37/10* (2013.01); *B32B 37/12* (2013.01); *B32B 38/1833* (2013.01); *B32B 2309/68* (2013.01); *B32B 2535/00* (2013.01)

(58) Field of Classification Search
CPC ....... B32B 27/322; B32B 27/36; B32B 27/32; B32B 27/40; B32B 27/283; B32B 27/30; B32B 27/325; B32B 27/286; B32B 27/08; B32B 7/12; B32B 38/1833; B32B 2535/00; B32B 2309/68; B30B 1/32
See application file for complete search history.

(56) References Cited

U.S. PATENT DOCUMENTS

| | | |
|---|---|---|
| 5,496,433 A | 3/1996 | Miyashita et al. |
| 5,718,791 A | 2/1998 | Spengler |
| 7,658,217 B2 | 2/2010 | Vontell et al. |
| 2003/0183345 A1 | 10/2003 | Soberay |
| 2003/0205333 A1 | 11/2003 | Hayafuji et al. |
| 2004/0011225 A1 | 1/2004 | Kano et al. |
| 2005/0039856 A1* | 2/2005 | Kubota .................. B32B 37/10 156/498 |
| 2005/0089597 A1 | 4/2005 | Ito |
| 2005/0183789 A1 | 8/2005 | Hong |
| 2007/0139451 A1 | 6/2007 | Somasiri et al. |
| 2008/0053609 A1 | 3/2008 | Renz |
| 2014/0179909 A1* | 6/2014 | O'Halloran ....... B01L 3/502707 536/25.41 |

OTHER PUBLICATIONS

JP 2004-330291 (cited in May 24, 2019 IDS and published Nov. 25, 2004) Machine Translation of Description (Google and EPO) (Year: 2004).*

* cited by examiner

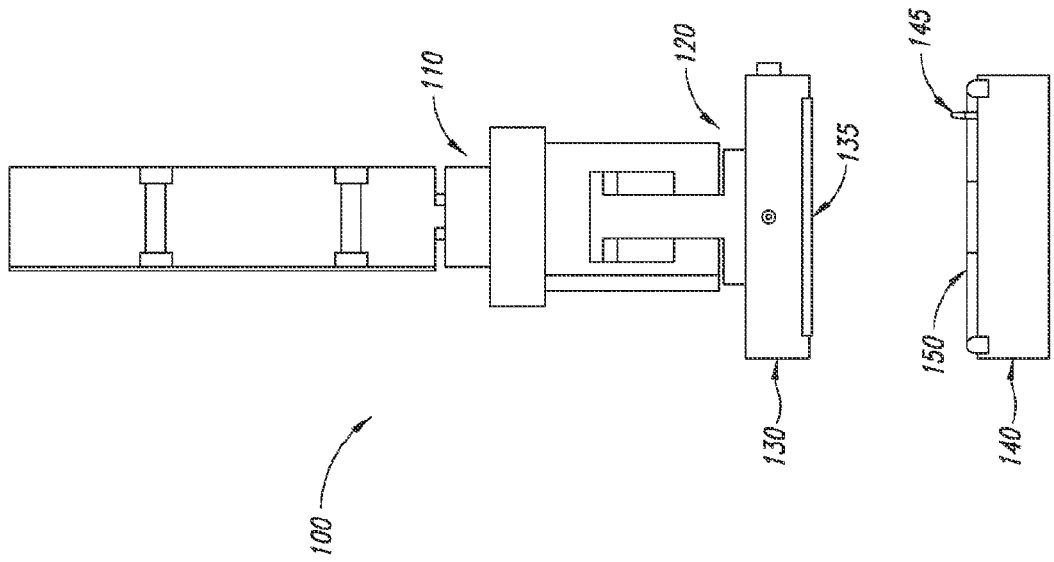

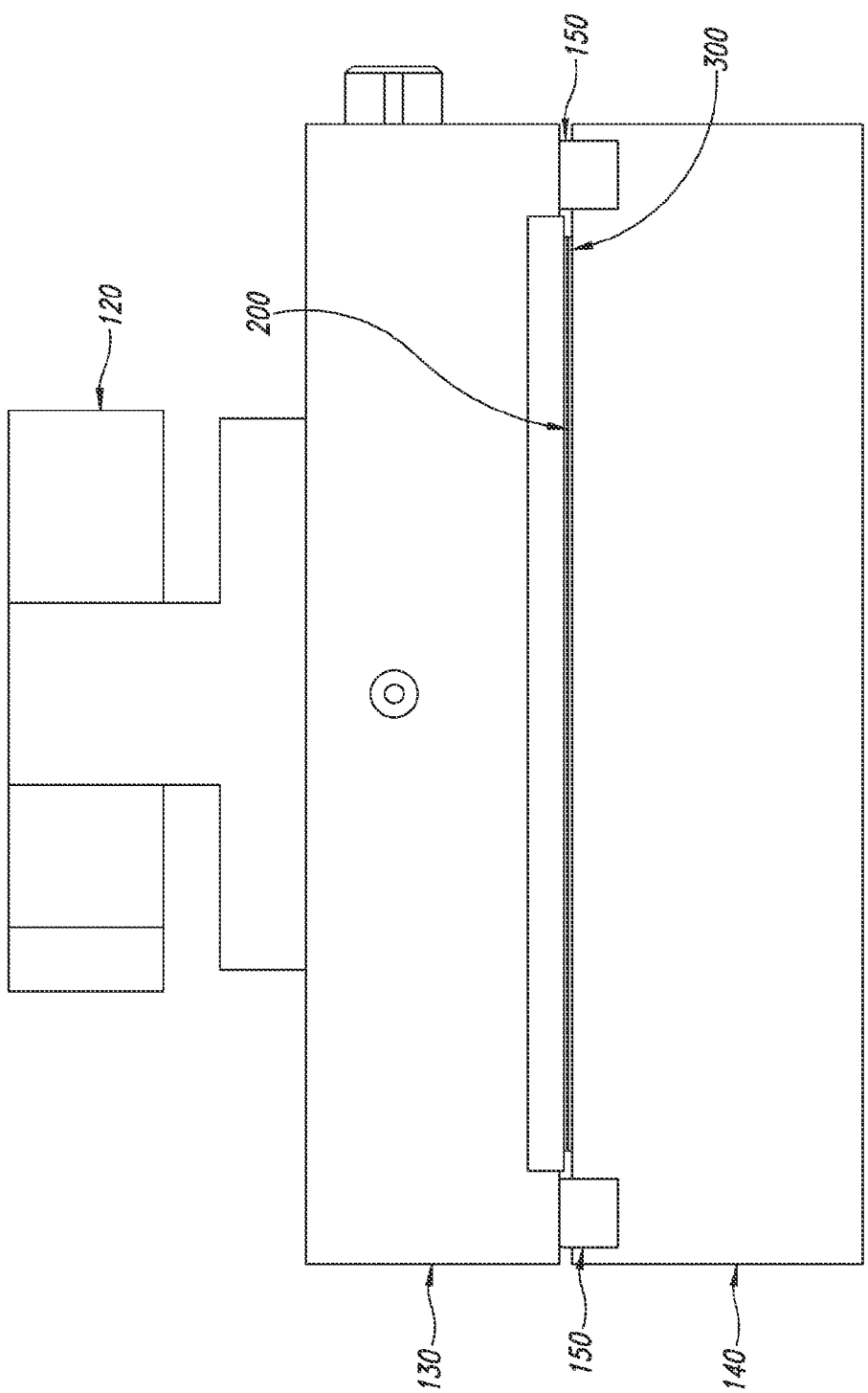

METHODS AND APPARATUS FOR LAMINATION OF RIGID SUBSTRATES BY SEQUENTIAL APPLICATION OF VACUUM AND MECHANICAL FORCE

FIELD

Embodiments of the invention generally pertain to methods and apparatus for the lamination of rigid substrates, more particularly, to methods and apparatus for fabricating laminated microfluidic devices.

BACKGROUND

The technology of manipulating minute volumes of biological and chemical fluids is widely referred to as microfluidics. The realized and potential applications of microfluidics include disease diagnosis, life science research, biological and/or chemical sensor development, and others appreciated by those skilled in the art.

A microfluidic structure including a substrate having one or more microfluidic channels or pathways and a cover plate or a second or more substrates with fluid pathways that may or may not be interconnected, may commonly be referred to as a microfluidic chip or cartridge. Highly integrated microfluidic chips are sometimes called "labs on a chip".

Microfluidic structures or devices are commonly made from polymeric, "plastic" materials. Polymeric microfluidic structures have advantageous low material costs and the potential for mass production. However, the fabrication of polymeric microfluidic chips presents a variety of challenges. For example, microfluidic chips may contain sealed microstructures. These can be formed by enclosing a substrate having a pre-fabricated fluid pathway or other microfeatures with a thin cover plate, or with one or more additional substrates to form a three-dimensional fluid network. The pathways or other microstructures have typical dimensions in the range of micrometers to millimeters. This multilayer microfluidic structure is integrated, or joined together, by various conventional techniques. These techniques include thermal, ultrasonic and solvent bonding. Unfortunately, these techniques frequently alter the mated surfaces and yield distorted or completely blocked microfluidic pathways due, for example, to the low dimensional rigidity of polymeric materials under the aforementioned bonding conditions.

The use of adhesive lamination may circumvent some of these potential difficulties by avoiding the use of excessive thermal energy or strong organic solvents. Conventional lamination systems employ opposing cylindrical rollers. The substrate materials for lamination are fed through a gap between the two moving rollers, which apply pressure to the leading edge of the stacked materials and bonds them together as they pass through the system. This process is an effective means to bond a flexible film to a substrate without entrapment of air bubbles, while providing minimum deformation to the laminated product. However, the curved surfaces of roller-based systems are not optimal for the lamination of rigid substrates. For example, such substrates may lack the flexibility required to feed through moving rollers in a manner that maintains the precise substrate registration critical for ensuring the integrity of the integrated microfluidic features.

Alternative systems and methods for lamination of rigid substrates include planar press or "hinge" systems in which substrates are stacked, or "sandwiched", between upper and lower platforms prior to application of a laminating force.

One considerable drawback to this approach in the fabrication of microfluidic devices is the entrapment of air between the stacked substrates during lamination, resulting in deformations, such as bubbles or voids, in the final product. Such deformations may significantly compromise the function of the laminated microfluidic device, particularly when they arise in features such as fluidic channels or optical display windows. Accordingly, embodiments of the invention are directed to methods and apparatus for lamination of rigid structures that address these recognized shortcomings of the current state of technology, and which provide further benefits and advantages as those persons skilled in the art will appreciate.

BRIEF SUMMARY

The present invention provides methods and apparatus for the lamination of substrates by the sequential application of vacuum and mechanical forces. Advantages of the methods and apparatus include the manufacture of rigid, laminated products that are substantially free of air pockets or voids.

In one aspect, the method involves the steps of providing a stack of rigid substrate members on a base portion of a lamination apparatus, providing a first force to a cover portion of the lamination apparatus to sealedly contact the cover portion with a gasket on the base portion to create a sealed chamber between the base portion and the cover portion, applying a vacuum to the sealed chamber to evacuate air from the chamber, and providing a second force to the cover portion of the apparatus to compress the gasket and stack of substrates to produce a laminated product that is substantially free of air bubbles or voids.

In one embodiment, the first force is provided by a long-stroke cylinder and the second force is provided by a short-stroke cylinder. In an alternative embodiment, the first force and the second force are provided by the same cylinder. In yet another embodiment, the method may further include the step of providing a resistance force to the first force, wherein the resistance force prevents compression of the gasket prior to the step of applying the vacuum to the sealed chamber. In certain embodiments, the resistance force is provided by a spring.

In other embodiments, the rigid substrate members are substantially flat and may be polymeric materials. In yet another embodiment, the rigid substrate members are layers of a microfluidic device and may further include at least one flexible layer that may be an adhesive layer.

In yet other embodiments, the method may also include the step of applying heat to the sealed chamber.

Another embodiment of the invention is directed to an apparatus for laminating rigid substrate members that includes a base portion configured to support a stack of rigid substrates, wherein the base portion includes a compressible gasket and at least one alignment pin, a cover portion configured for sealedly contacting the compressible gasket to form a sealed chamber enclosing the stack of rigid substrate members, at least one stroke-producing cylinder configured to extend to the cover portion and apply a first force to bring the cover portion into contact with the alignment pin and gasket of the base portion to form the sealed chamber, and a vacuum port configured for attachment to a vacuum source.

In certain embodiments, the apparatus further includes a second stroke-producing cylinder configured to extend to the sealed chamber and provide a second force to compress the gasket and stack of rigid substrates to produce a laminated product. In alternative embodiments, the apparatus includes at least one spring configured to provide a resistance force to the stroke-producing cylinder and the stroke-producing cylinder may further be configured to overcome the resistance force after formation of the sealed chamber and compress the gasket and stack of rigid substrates to produce a laminated product.

In yet another embodiment, the apparatus may further include a heat source.

BRIEF DESCRIPTION OF THE DRAWINGS

FIG. 1A is a cutaway view of one embodiment of the lamination apparatus of the present invention in a load position with cylinders refracted.

FIG. 2C is a close-up view of one embodiment of the lamination apparatus of the present invention with short-stroke cylinder extending and compressing gasket.

DETAILED DESCRIPTION

Figure 1B:
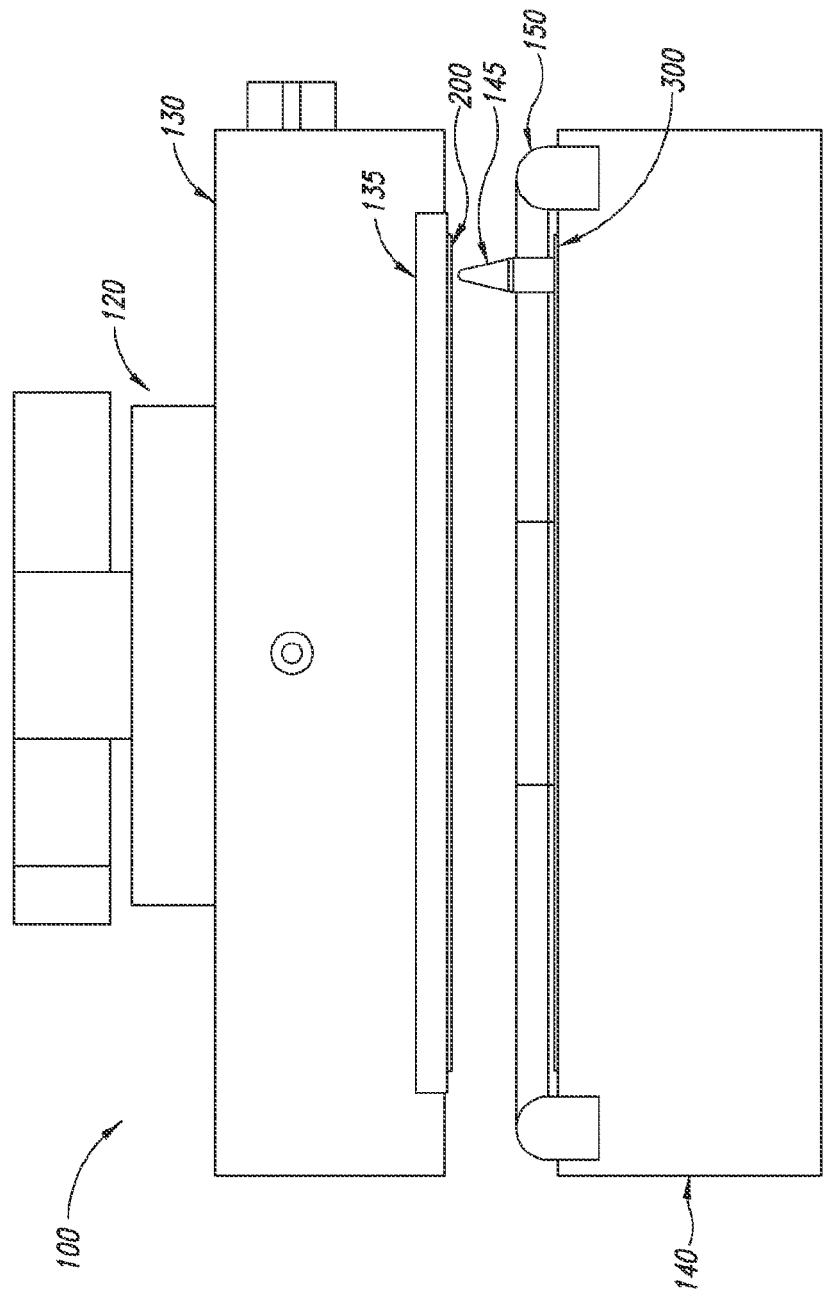
FIG. 1B is a close-up view of one embodiment of the lamination apparatus of the present invention with long-stroke cylinder extending towards alignment pin and gasket.

FIGS. 1A and 1B show cutaway and close-up views, respectively, of one embodiment of a lamination apparatus 100 of the present invention in a load position. In this configuration, cylinder 110 and cylinder 120 are in a retracted position. In certain embodiments, cylinder 110 may be referred to as the "long-stroke cylinder" and cylinder 120 may be referred to as the "short-stroke cylinder". In this embodiment, an upper surface of the apparatus is provided by cover portion 130, which may be referred to as the "top vacuum chuck", and a lower surface is provided by base portion 140, which may be referred to as the "bottom vacuum chuck". In this depiction, the apparatus is configured to receive a stack of substrates to be laminated. Top vacuum chuck may optionally be provided with a compliant silicone pressure pad 135. Bottom vacuum chuck 140 may be provided with one or more alignment pins 145 to maintain precise register and alignment of surfaces and substrates during lamination. Gasket 150 provides for the formation of a sealed chamber between top vacuum chuck 130 and bottom vacuum chuck 140. Gasket 150 may be fabricated from any material that maintains an airtight seal between top and bottom vacuum chucks while under compression. Illustrative gasket materials include any rubber or PVC material, e.g. silicone, butyl, neoprene, nitrile, vinyl, and the like. In operation, substrates for lamination 200 and 300 are placed on top and bottom vacuum chucks 130 and 140 while cylinders 110 and 120 are retracted. In other embodiments, the substrates may be stacked directly on each other and placed on either vacuum chuck. In other embodiments, lamination of two or more substrates is contemplated. In certain embodiments, lamination of at least three substrates is contemplated and may include a flexible substrate, such as a film, that may further comprise an adhesive material as described further herein.

Figure 2A:
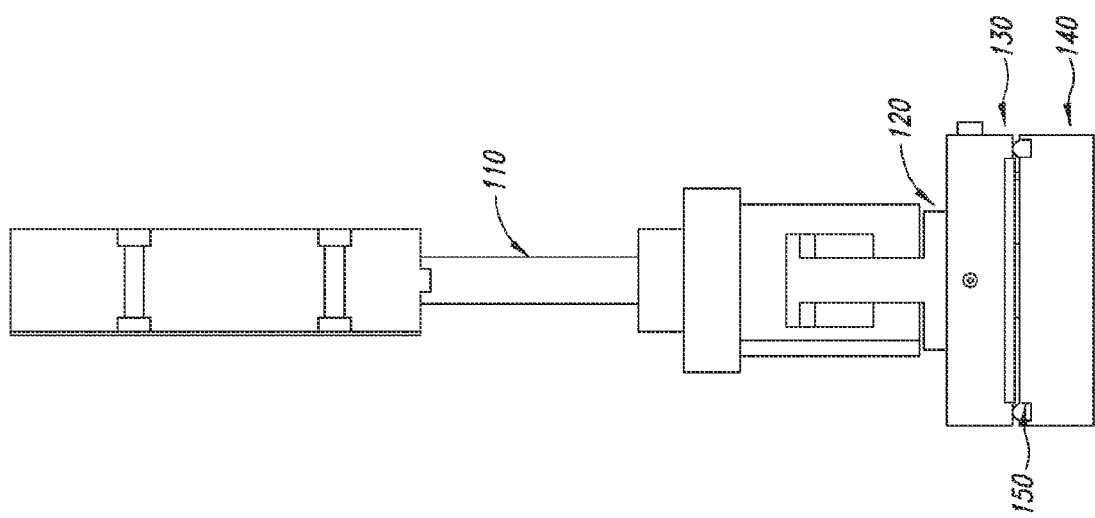
FIG. 2A is a cutaway view of one embodiment of the lamination apparatus of the present invention with long-stroke cylinder extended to gasket.
Figure 2B:
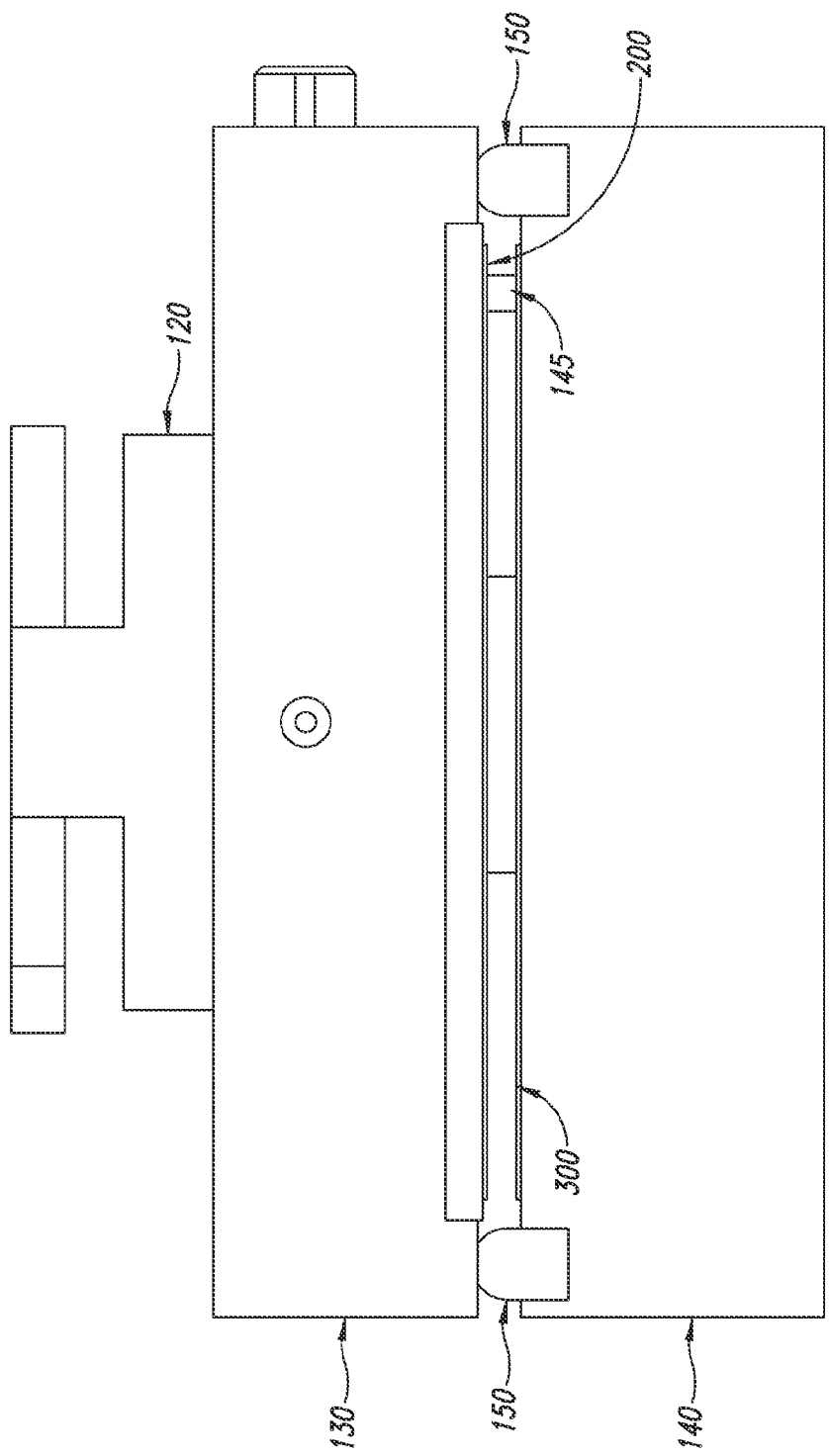
FIG. 2B is a close-up view one embodiment of the lamination apparatus of the present invention with the long-stroke cylinder extended to gasket, creating a sealed chamber.

FIGS. 2A and 2B show cutaway and close-up views, respectively, of one embodiment of a lamination apparatus 100 of the present invention with long-stroke cylinder 110 in an extended configuration. In operation, the first cylinder stroke, herein described as the "long-stroke" extends cylinder 110 to bring top vacuum chuck 130 into contact with gasket 150 of bottom vacuum chuck 140 to form a sealed chamber. Top substrate 200 and bottom substrate 300 are maintained in precise register by the one or more alignment pins 145 during formation of the sealed chamber. Short stroke cylinder 120 is not actuated during formation of the sealed chamber. The sealed chamber may be evacuated of air by application of a vacuum from a vacuum source. As used in connection with the present invention, the term "vacuum" describes negative pressure as compared to ambient pressure. The term does not require that an absolute or extremely negative pressure vacuum be drawn or maintained. Although in some instances, it may be possible and/or desirable to achieve large negative pressures in connection with the present invention. In operation, the vacuum will be sufficient to remove substantially all air from between substrates 200 and 300 in the sealed chamber. In this manner, all air is removed prior to lamination of substrates, preventing the problematic formation of air bubbles or voids in the final laminated product. FIG. 2C shows gasket 150 under compression, which may be accomplished by actuation of short-stroke cylinder 120 and/or by reducing air pressure in the sealed chamber.

Figure 3:
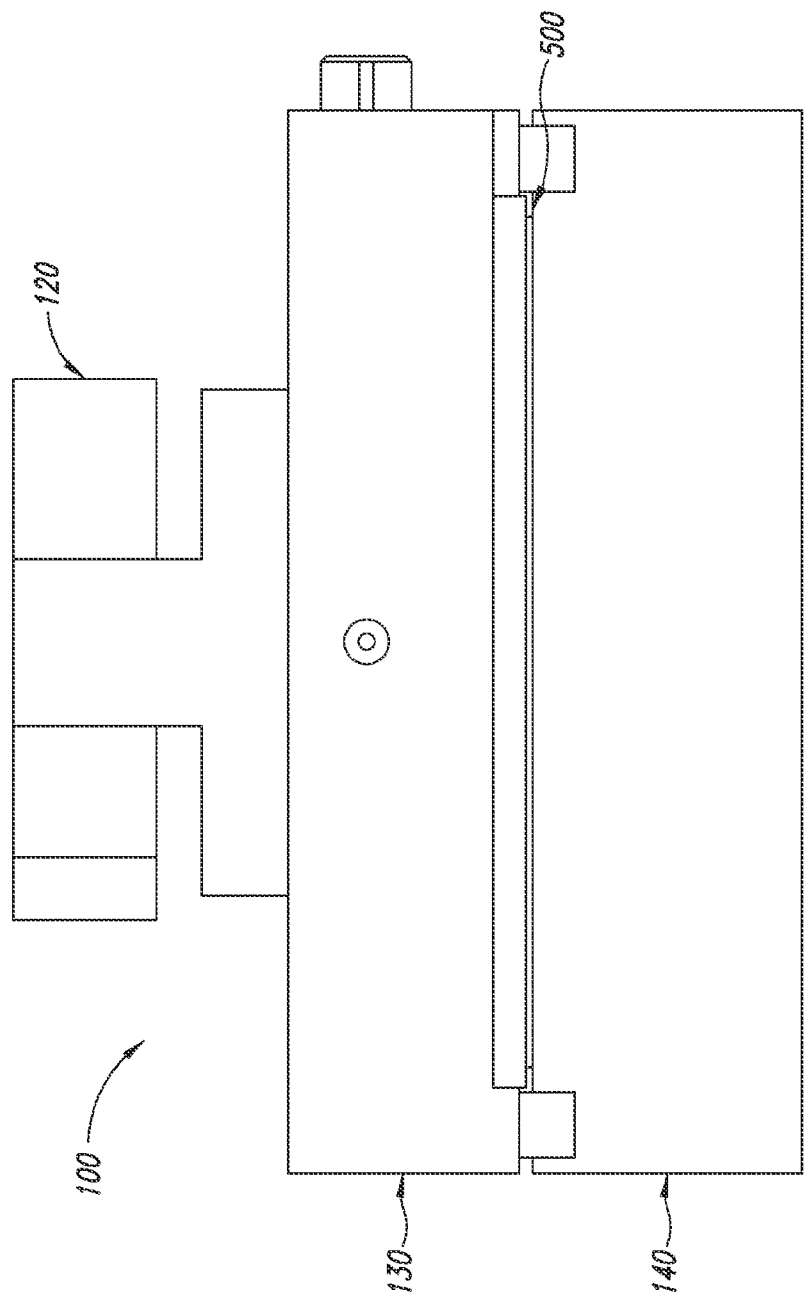
FIG. 3 is a close-up view of one embodiment of the lamination apparatus of the present invention with short-stroke cylinder extending and compressing stacked substrates into a laminated product.

FIG. 3 depicts a close-up view of one embodiment of a lamination apparatus 100 of the present invention with short-stroke cylinder 120 in an extended configuration. In operation, the second stroke, herein referred to as the "short-stroke", actuates short stroke cylinder 120, which applies extended mechanical force to top vacuum chuck 130 and bottom vacuum chuck 140 to compress the substrates into laminated product 500. The amount of mechanical force necessary to achieve substrate lamination will depend on the physical properties of the substrates, but will be readily apparent to one of ordinary skill in the art. Exemplary amounts of pressure or force applied to the apparatus to complete the laminating process are up to about 10 psi, more particularly between 0 to 2.5 psi. Illustrative compression times of the lamination process are from seconds to minutes. As described herein, the sequential actuation of the long-stroke and short-stroke cylinders enables initial formation of a sealed chamber that may be evacuated of air by vacuum followed by compression of the chamber by mechanical force to laminate substrates. The sequential application of vacuum and mechanical force as described herein prevents entrapment of air bubbles that create voids or defects in the laminated product.

Figure 4:
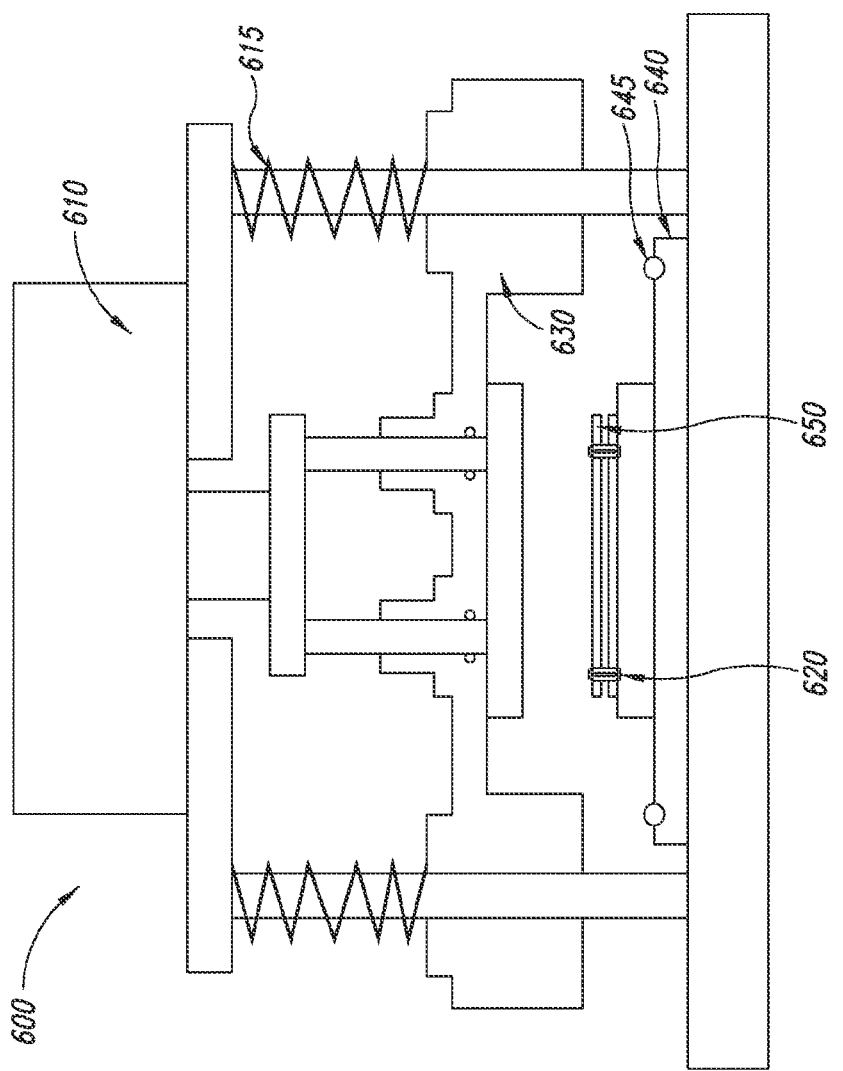
FIG. 4 is a close-up view of another embodiment of a lamination apparatus of the present invention in a load position with cylinders retracted and a spring in relaxed configuration.

FIG. 4 depicts a close-up view of an alternative embodiment of a lamination apparatus 600 of the present invention in the load position. Cylinder 610 is retracted and resistance spring 615 is not under compression. Top vacuum chuck 630 and bottom vacuum chuck 640 are in an open configuration. Bottom vacuum chuck 640 is provided with one or more vacuum alignment pins 620 and gasket 645. In this embodiment, all substrates to be laminated are provided as stack 650 on bottom vacuum chuck 640 when cylinder 610 is refracted.

Figure 5:
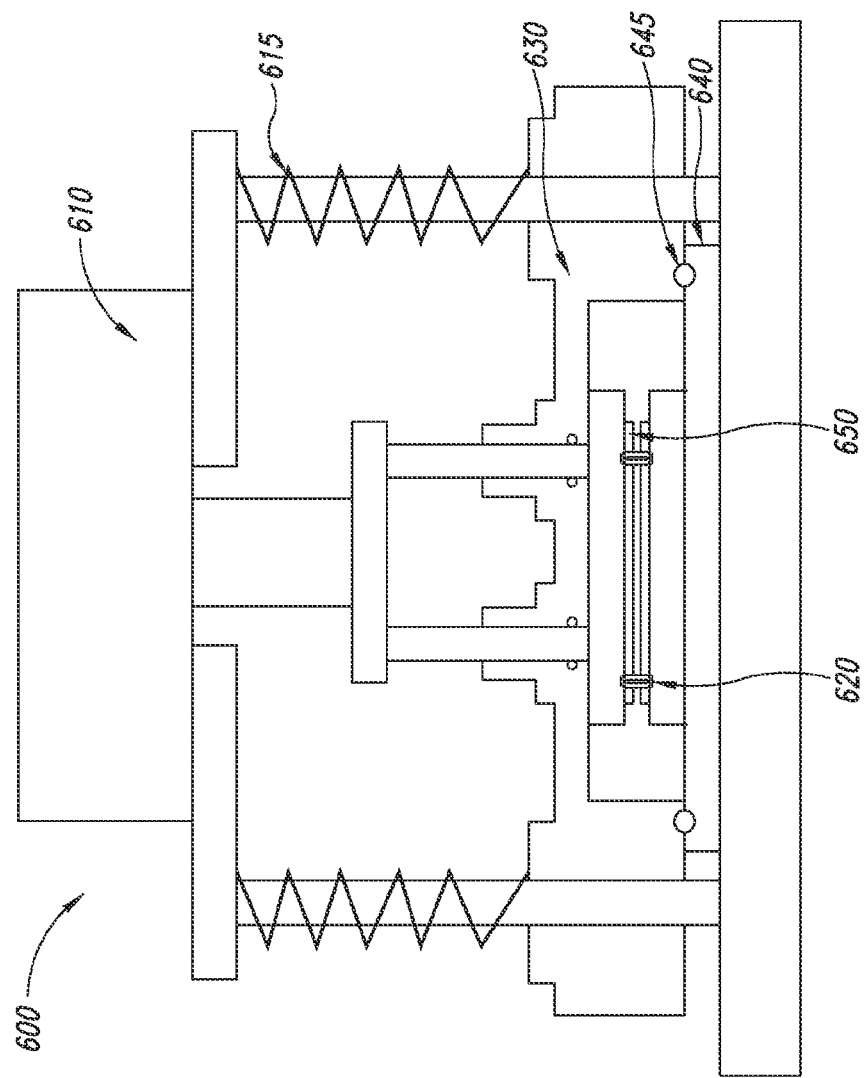
FIG. 5 is a close-up view of another embodiment of a lamination apparatus of the present invention with a cylinder extending to alignment pins and gasket with spring providing a resistance force.

FIG. 5 depicts a close-up view of lamination apparatus 600 with cylinder 610 at extension. In this configuration, spring 615 is not compressed and provides a resistance force to cylinder 610. In operation, the extension of cylinder 610 brings top vacuum chuck 630 into contact with gasket 645 on bottom vacuum chuck 640, creating a sealed chamber. Top vacuum chuck and bottom vacuum chuck are aligned by the one or more alignment pins 645, which maintains proper alignment and registration of the stacked substrates prior to lamination. Spring 615 provides a resistance force to cylinder 610 when contact is made between top and bottom vacuum chucks, which temporarily halts the downward movement of cylinder 610 to create the sealed chamber. The sealed chamber may then be evacuated of air by application of vacuum as described herein.

Figure 6:
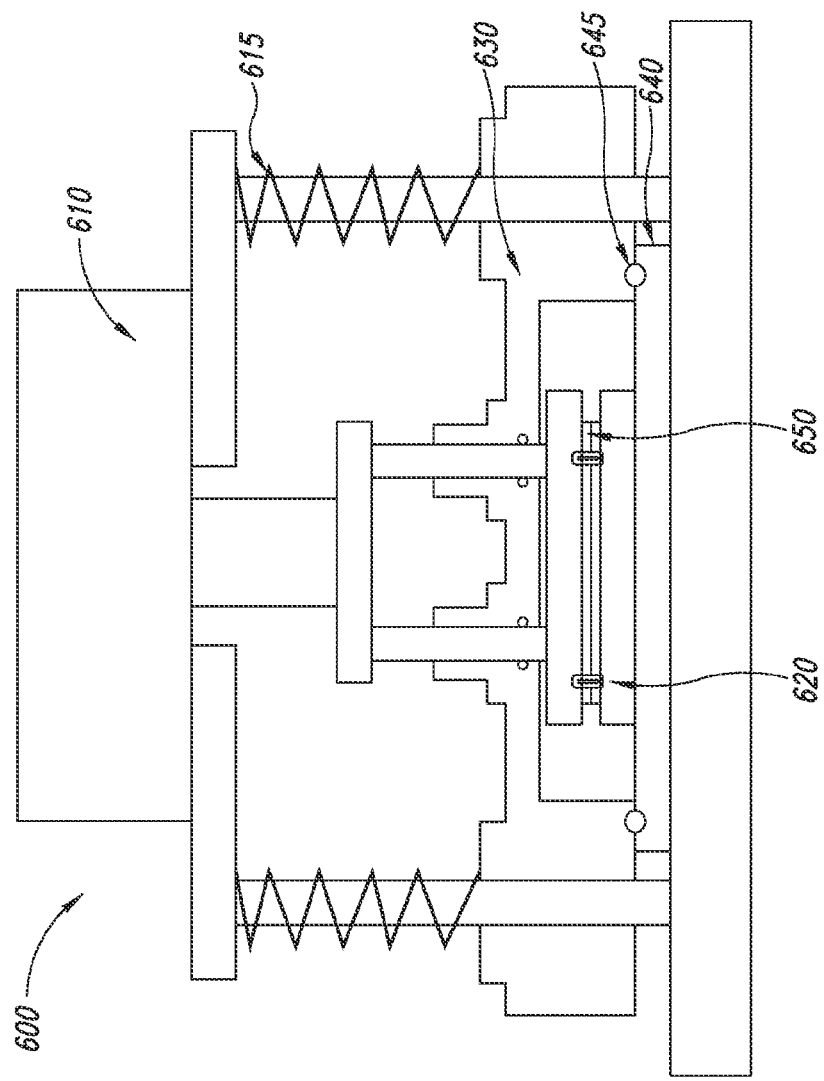
FIG. 6 is a close-up view of another embodiment of a lamination apparatus of the present invention with a spring resistance force overcome and compression of a stack of substrates into a laminated product.

FIG. 6 depicts a close-up view of lamination apparatus 600 with cylinder 610 at full extension. In operation, the resistance force provided by spring 615 has been overcome by cylinder 610, which applies extended force to top vacuum chuck 630 and bottom vacuum chuck 640 to compress the sealed chamber and complete substrate lamination. The evacuation of air from the sealed chamber prior to full extension of cylinder 610 prevents entrapment of air bubbles in the laminated product 650, a clear advancement in the art.

The methods and apparatus described herein are suitable in the manufacture of any product comprised of at least one rigid substrate layer. One exemplary embodiment of the invention is directed to a method and apparatus for manufacturing a laminated, polymeric microfluidic structure. As used herein, the word "microfluidic structure" generally refers to structural features on a microfluidic substrate component with walls having at least one dimension in the range of about 0.1 micrometer to about 1000 micrometers. These features may be, but are not limited to, microchannels, microfluidic pathways, microreservoirs, microvalves or microfilters.

Microfluidic structures, e.g. microfluidic cartridges or cards, are comprised of plastic bodies manufactured by a process of bonding together substrate layers. In an embodiment of the present invention, bonding together of layers is achieved by lamination. Each cartridge can be formed by a pair of substrate members or layers or of a plurality of layers bonded together. The term "layer" refers to any of one or more generally planar, solid substrate members comprising a cartridge. "Layers" or "substrates" are generally rigid structures but may also include glue layers or flexible sheets, films, pressure sensitive adhesives (PSA), or thermal adhesives.

The term "polymeric" refers to a macromolecular structure or material having a molecular weight that is substantially higher than the constituent monomers and, which is produced by a polymerization reaction. All materials commonly and herein referred to as "plastic" materials are polymeric materials. Plastic is a preferred material for building microfluidic devices of the present invention. Plastics which may be used include olefins, cyclic polyolefins, cyclic olefin copolymers, polyesters, polyethylene terephthalate, polybutylene terephthalate, polystyrenes, polycarbonates, polypropylene, polyethylene, polyurethane, polyether sulfone, polyvinyl chloride, polyvinyl acetate, polyamides, polyimides, polyacrylate, polymethylmethacrylate (PMMA), polytetrafluoroethylenes, polydimethylsiloxane (PDMS), polysilane, cellulose triacetate, thermoplastics in general, and so forth. Composites and copolymers are also frequently used. The knowledge to select plastics or other solid substrates and conventional adhesives is widely known in related arts.

The preceding specific embodiments are illustrative of the practice of the invention. Various modifications and alterations of this invention will become apparent to those skilled in the art without departing from the scope of this invention, and it should be understood that this invention is not to be unduly limited to illustrative embodiments set forth herein.

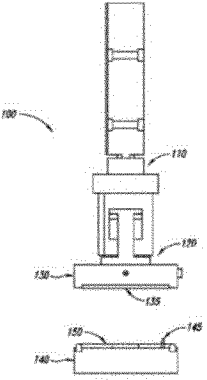

What is claimed is:

1. A method of manufacturing a laminate of rigid substrate members comprising:
providing a stack of rigid substrate members on a base portion of a lamination apparatus;
providing a first force to extend a cover portion of the lamination apparatus to sealedly contact the cover portion with a gasket on the base portion to create a sealed chamber between the base portion and the cover portion, wherein the first force is provided by a long-stroke cylinder;
providing a resistance force to the first force, wherein the resistance force prevents compression of the gasket,
after providing the resistance force, applying a vacuum to the sealed chamber to evacuate air from the chamber; and
providing a second force to extend the cover portion of the apparatus to compress the gasket and stack of substrates to produce a laminated product that is substantially free of air bubbles or voids, wherein the second force is provided by a short-stroke cylinder.

2. The method of claim 1, wherein the resistance force is provided by a spring.

3. The method of claim 1, wherein the rigid substrate members are substantially flat.

4. The method of claim 1, wherein the rigid substrate members comprise polymeric materials.

5. The method of claim 1, wherein the rigid substrate members comprise layers of a microfluidic device.

6. The method of claim 5, wherein the layers of a microfluidic device further comprise at least one flexible layer.

7. The method of claim 6, wherein the at least one flexible layer comprises an adhesive layer.

8. The method of claim 1, further comprising applying heat to the sealed chamber.

9. An apparatus for laminating rigid substrate members comprising:
a base portion configured to support a stack of rigid substrate members, wherein the base portion comprises a compressible gasket, and at least one alignment pin;
a cover portion configured for sealedly contacting the compressible gasket to form a sealed chamber enclosing the stack of rigid substrate members;
a long-stroke cylinder configured to extend to the cover portion and apply a first force to the cover portion to extend the cover portion and bring the cover portion into contact with the alignment pin and gasket of the base portion to form the sealed chamber;
at least one spring configured to provide a resistance force to the long-stroke cylinder,
a vacuum port configured for attachment to a vacuum source; and a short-stroke cylinder configured to apply a second force to the cover portion to extend the cover portion and compress the compressible gasket and the stack of rigid substrate members to produce a laminated product.

10. The apparatus of claim 9, wherein the short-stroke cylinder is configured to overcome the resistance force after formation of the sealed chamber and compress the compressible gasket and the stack of rigid substrate members to produce the laminated product.

11. The apparatus of claim 9, further comprising a heat source.

* * * * *

UNITED STATES PATENT AND TRADEMARK OFFICE
CERTIFICATE OF CORRECTION

PATENT NO. : 10,518,517 B2
APPLICATION NO. : 15/300213
DATED : December 31, 2019
INVENTOR(S) : Simmons et al.

Page 1 of 3

It is certified that error appears in the above-identified patent and that said Letters Patent is hereby corrected as shown below:

On the Title Page

Replace the Title Page with the Attached Title Page

In the Claims

Column 6, Lines 38-39:
Cancel Claim 3, that is, the text beginning with "3. The method of" and ending "substantially flat."

Column 6, Lines 40-41:
Cancel Claim 4, that is, the text beginning with "4. The method of" and ending "polymeric materials."

Column 6, Line 42:
Replace "5" with -- 3 --

Column 6, Lines 44-46:
Cancel Claim 6, that is, the text beginning with "6. The method of" and ending "one flexible layer."

Column 6, Lines 47-48:
Cancel Claim 7, that is, the text beginning with "7. The method of" and ending "an adhesive layer."

Column 6, Lines 49-50:
Cancel Claim 8, that is, the text beginning with "8. The method of" and ending "the sealed chamber."

Column 6, Line 51:
Replace "9" with -- 4 --

Column 7, Line 5:
Replace "10" with -- 5 --

Signed and Sealed this
Eighth Day of September, 2020

Andrei Iancu
*Director of the United States Patent and Trademark Office*

Column 7, Lines 10-11:
Cancel Claim 11, that is, the text beginning with "11. The apparatus of" and ending "a heat source."

(12) United States Patent
Simmons et al.

(10) Patent No.: US 10,518,517 B2
(45) Date of Patent: Dec. 31, 2019

(54) METHODS AND APPARATUS FOR LAMINATION OF RIGID SUBSTRATES BY SEQUENTIAL APPLICATION OF VACUUM AND MECHANICAL FORCE

(71) Applicant: PerkinElmer Health Sciences, Inc., Waltham, MA (US)

(72) Inventors: Reed Simmons, Snohomish, WA (US); Tatsuya Minakawa, Yokohama (JP); Michael Corliss, Wilsonville, OR (US); Alan Swan, Wilsonville, OR (US); Nick Zenner, White Bear Lake, MN (US); Emily Fanucci, White Bear Lake, MN (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 334 days.

(21) Appl. No.: 15/300,213

(22) PCT Filed: Mar. 27, 2015

(86) PCT No.: PCT/US2015/023033
§ 371 (c)(1),
(2) Date: Sep. 28, 2016

(87) PCT Pub. No.: WO2015/148945
PCT Pub. Date: Oct. 1, 2015

(65) Prior Publication Data
US 2017/0182758 A1  Jun. 29, 2017

Related U.S. Application Data

(60) Provisional application No. 61/971,726, filed on Mar. 28, 2014.

(51) Int. Cl.
*B32B 37/10* (2006.01)
*B32B 7/12* (2006.01)
(Continued)

(52) U.S. Cl.
CPC .......... *B32B 37/1018* (2013.01); *B30B 12/00* (2013.01); *B32B 7/12* (2013.01);
(Continued)

(58) Field of Classification Search
CPC ..... B32B 37/1018; B32B 37/12; B32B 37/10; B32B 37/0046; B32B 37/003;
(Continued)

(56) References Cited

U.S. PATENT DOCUMENTS 4,681,649 A     7/1987  Fazlin
5,088,400 A *   2/1992  Ferguson ............ B30B 15/0029
                                                    100/214
(Continued)

FOREIGN PATENT DOCUMENTS

JP     2004-330291 A    11/2004

OTHER PUBLICATIONS

IBM Technical Disclosure, Koch, P., Pohl, G., and Schmid, H.J., "Method for Operating a Multiple-Layer Laminating Press," published Jan. 1, 1986 (IP.com No. IPCOM000059721D; electronic publication date: Mar. 8, 2005).*
(Continued)

*Primary Examiner* — Christopher T Schatz
*Assistant Examiner* — Cynthia L Schaller
(74) *Attorney, Agent, or Firm* — Seed Intellectual Property Law Group LLP

(57) ABSTRACT

Method and apparatus for lamination of substrates, e.g. rigid plastic layers, to manufacture laminated products. The methods include the sequential application of vacuum and mechanical force through a two-stroke process performed by a lamination apparatus having one or more force-producing stroke cylinders. Actuation of a cylinder to produce a first stroke creates a sealed chamber within the apparatus, enclosing a stack of substrates to be laminated. The sealed chamber
(Continued)

5 Claims, 9 Drawing Sheets